United States Patent [19]

Schonstein et al.

[11] Patent Number: 5,520,211
[45] Date of Patent: May 28, 1996

[54] PRESSURE REDUCTION AND FLOW REGULATION DEVICE

[75] Inventors: David Schonstein, Rose Bay; William Shore, Ashfield, both of Australia

[73] Assignee: The Commonwealth Industrial Gases Limited, Ashfield, Australia

[21] Appl. No.: 270,854

[22] Filed: Jul. 5, 1994

[30] Foreign Application Priority Data

Jul. 6, 1993 [AU] Australia ..................... PL 9817

[51] Int. Cl.⁶ .................... F16K 49/00; F16K 31/36
[52] U.S. Cl. .................... 137/340; 137/341; 137/505.46; 137/487
[58] Field of Search ............... 137/101.19, 101.11, 137/487.5, 340, 341, 505.46, 487

[56] References Cited

U.S. PATENT DOCUMENTS

| | | | |
|---|---|---|---|
| 1,988,289 | 1/1935 | Wittemann | 137/341 |
| 2,515,835 | 7/1950 | Preston | 137/341 |
| 5,257,640 | 11/1993 | Pelajoved | 137/341 |
| 5,300,047 | 4/1994 | Beurrier | 137/487.5 |

FOREIGN PATENT DOCUMENTS

| | | |
|---|---|---|
| 2114777 | 3/1979 | Australia . |
| 1348183 | 4/1987 | Australia . |
| 3651684 | 7/1987 | Australia . |
| 4024489 | 4/1988 | Australia . |
| 4222885 | 4/1988 | Australia . |
| 4485085 | 7/1988 | Australia . |
| 3077389 | 4/1991 | Australia . |
| 5499590 | 7/1992 | Australia . |
| 5398690 | 8/1992 | Australia . |

*Primary Examiner*—A. Michael Chambers
*Attorney, Agent, or Firm*—R. Hain Swope; David A. Draegert; Larry R. Cassett

[57] ABSTRACT

A pressure regulator for lower pressure distribution of gases from a higher pressure source of gas including a gas inlet and a gas outlet defining a gas path therebetween, a regulating element disposed downstream of the gas inlet remote from the gas path, including a resiliently displaceable device responsive to gas pressure and connected to a valve at the gas inlet to thereby regulate the gas pressure at the gas outlet, and to gas distribution systems employing the same.

16 Claims, 3 Drawing Sheets

PRESSURE REDUCTION AND FLOW REGULATION DEVICE

FIELD OF THE INVENTION

The present invention relates to gas pressure regulators particularly suited for low pressure delivery of liquifiable and permanent gases from a high pressure source and to distribution systems employing the same.

BACKGROUND OF THE PRIOR ART

The invention has been developed primarily for the controlled delivery of liquifiable gases or gas mixtures such as $CO_2$ or $CO_2$ based preparations, examples of which include $CO_2$ based pesticide formulations. However, it will be appreciated that the invention may be used to regulate the distribution of many other types of gases, both liquifiable and non-liquifiable.

Gaseous pesticide preparations having a $CO_2$ base are particularly useful for fumigating grain storage silos. However, numerous problems have been encountered when trying to regulate the distribution of such gas products. One reason is because the product is stored in the liquid state under high pressures of around 5000 kPa and is preferably distributed at a significantly lower pressure of around 10 to 100 kPa.

Operational problems are usually encountered when using conventional pressure regulating devices to distribute gaseous products of this kind, particularly with gases such as $CO_2$. This is due to the severe pressure and temperature changes that occur when distributing the gas as well as the associated volumetric expansion caused by the resultant gasification of the liquid gas. While the severity of these effects will vary with various gases, they will nonetheless be present in the low pressure distribution of almost any gas from a higher pressure source.

In the prior art, pressure regulation of such preparations was usually achieved via control valves for high flow rate applications and special purpose regulators for lower flow rate installations. However, neither of these devices are generally able to maintain an even pressure when regulating liquified gases to a gaseous state. In such cases dry ice tends to form at the valve seat causing "spitting" and the output tends to fluctuate wildly due to the large increase in the volume of the gas and the irregularity of the flow. It should also be noted that the use of control valves with the necessary associated control equipment is a relatively high cost option.

Furthermore, as these various prior art regulating devices are usually designed to operate in-line, the components of the device are subjected directly to variations in temperature and volumetric changes referred to above, and as such may have a reduced life span.

Another problem associated with the regulation and delivery of preparations such as $CO_2$ based pesticides, is the gradual build-up of resin-like polymer residues which adversely affect the operation of the prior art regulation devices.

It should also be noted that regulators used in fumigant delivery systems for dispensing gaseous pesticides of this kind are often required to operate continuously without monitoring for periods of time on the order of 30 days. Accordingly, safety, reliability and consistency of operation are extremely important. Furthermore, as there is a large market composed of small farming operations, there is a need for a regulating system that is reliable but not prohibitively expensive.

It is an object of the present invention to provide a gas pressure regulator that overcomes or at least ameliorates one or more of the above discussed disadvantages of the prior art.

SUMMARY OF THE INVENTION

According to a first aspect of the invention there is provided a pressure regulator for lower pressure distribution of gases from a higher pressure source, said pressure regulator comprising:

a gas inlet and a gas outlet defining a gas path therebetween;

a regulating element disposed downstream of the gas inlet and remote from the gas path;

valve means provided at the gas inlet; and heat exchanger means extending from said valve means and along at least a portion of the gas path;

said regulating element comprising resiliently displaceable means responsive to pressure generated by gas from the gas inlet and actuating means operatively connected to the valve means at the gas inlet to thereby regulate the pressure of the gas at the gas outlet.

It should be noted that all references to "gas inlet" are to the gas formed at the inlet valve exit and not to the higher pressure gas source.

Preferably, the regulating element is disposed at a position that is also downstream of the gas outlet.

Preferably, the actuating means is mechanically connected to the valve means in a manner which increases the mechanical advantage, such that a lower rated regulating element may be used and the sensitivity of the pressure regulator as a whole is enhanced.

In a preferred embodiment specifically designed for large scale use with liquifiable gas products such as $CO_2$, a heater is provided at the gas inlet that also thermally isolates the regulating element. In smaller scale low flow rate applications, the externally powered heater is preferably replaced by a nonpowered heat exchanger that works on heat transfer from external ambient temperature conditions. The heat exchanger prevents dry ice formation at the inlet by raising the delivery temperature of the gas, and simultaneously thermally isolates the regulating element so that it is not subjected to the potentially harmful effects of low operating temperatures.

Preferably, the resiliently displaceable means of the regulating element is of the type comprising a chamber separated by a diaphragm to define an active pressurizable chamber portion and an inactive chamber portion. The diaphragm is displaceable by the pressure of gas against a spring of predetermined tension and is connected to the inlet valve via a mechanical linkage that increases the mechanical advantage, thereby also increasing the sensitivity of the regulator.

In one embodiment of the invention, the regulating element comprises a modified proprietary gas regulator of the kind manufactured by the company REGO and identified as the LV4403SR and TR series. The units are modified by blocking the outlet and attaching an extended actuating arm to the linkage mechanism, such that the inlet valve of the regulator of the invention is external to and remote from the body of the regulating element.

In a preferred embodiment for large scale use with liquifiable gases, the heater comprises a generally hollow body adapted to connect to the inlet of the regulating element referred to above and receive the actuating means and the inlet valve. The heater has at least one, preferably a plurality of peripherally spaced heater elements mounted in the wall of the hollow body. The heater unit also desirably includes a gas heating passage, preferably in the form of a long length of tubing coiled around the periphery of the hollow body that is in fluid flow communication with the inlet valve.

In another embodiment of the invention particularly suited to low flow rate applications, the heater is a non-powered ambient temperature heater comprising a hollow, preferably finned body adapted for connection to the inlet of the regulating element and to receive the mechanically connected valve actuating means and inlet valve. The heater also includes an ambient temperature gas heating passage, preferably in the form of a long length of tubing coiled around the periphery of the hollow body that is in fluid flow communication with the inlet valve.

The inlet valve preferably comprises an inlet nozzle which is disposed within the hollow portion of the heater unit at an end remote from the regulating element and which is operatively associated with the actuating arm of the regulating element linkage. The outlet of the inlet nozzle is in fluid flow communication with the external gas heating coiled tubing.

According to a second aspect of the invention there is provided a gas distribution system for delivering gaseous fumigant from a higher pressure source to a storage area at a lower pressure, said gas distribution system comprising:

a pressure regulator of the type described above having a gas inlet adapted to receive gaseous fumigant from a higher pressure source; and flow monitoring means connected to the gas outlet for monitoring the flow rate of the gas at a lower pressure from the gas outlet to the storage area.

Preferably, the higher pressure source of gas is a pesticide fumigant in the form of a pressurized storage cylinder containing a pesticide in liquifiable gas base such as $CO_2$. The cylinder is desirably connected to the inlet valve of the regulator via a suitable conduit. This conduit preferably includes a check valve at its end adapted for connection to the cylinder to prevent moisture entering the system after disconnection and a solenoid valve adjacent the regulator inlet valve to selectively cut off the supply. Pressure indicators and in-line filters may be incorporated into the conduit in a customary manner.

It is further preferred that the distribution system includes a central control means such that it can be preprogrammed for automatic operation.

In a preferred form of the invention, the system also includes means to detect the absence of gas flow which may, in one preferred embodiment, comprise a pressure differential switch for measuring the pressure difference across the gas heating passage. A pressure sensor for the inlet may be disposed in the active chamber portion of the remote regulating element.

It will be clear that the pressure regulator according to the invention has many advantages over the prior art. For example, by placing the regulating element off-line with heat exchanger means associated with the gas path, the regulating element itself need not be capable of withstanding the extreme variations in temperature as would be required by most conventional in-line regulators.

It has also been possible to provide a pressure regulator that uses a relatively large diaphragm compared to that of the prior art, making the device generally more sensitive and stable.

BRIEF DESCRIPTION OF THE DRAWINGS

The following drawings in which like reference characters indicate like parts are illustrative of embodiments of the invention and are not intended to limit the invention as encompassed by the claims forming part of the application.

DETAILED DESCRIPTION OF THE INVENTION

Figure 1:
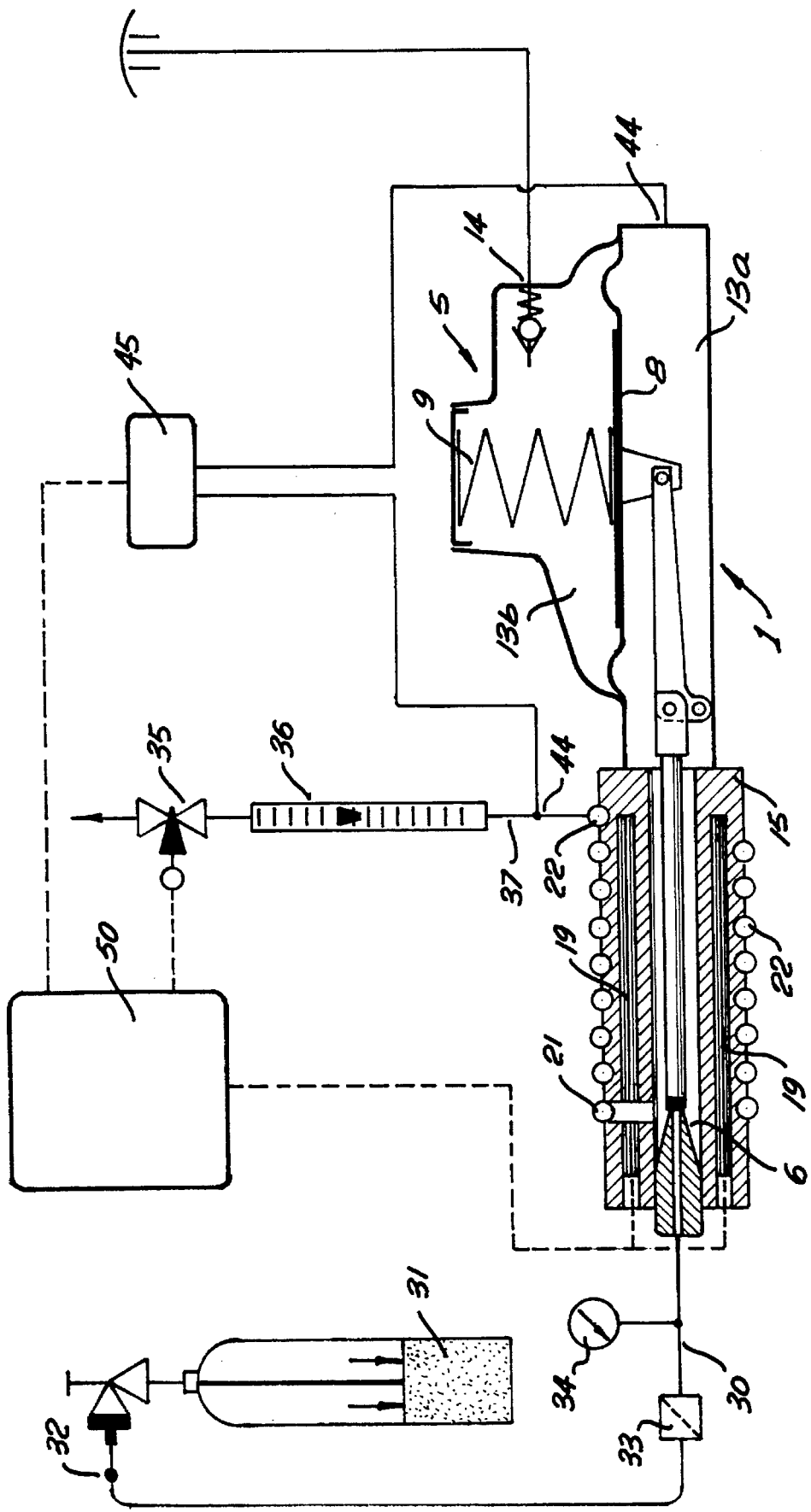
FIG. 1 is a schematic view of a gas distribution system incorporating a first embodiment of a pressure regulator according to the invention.
Figure 2:
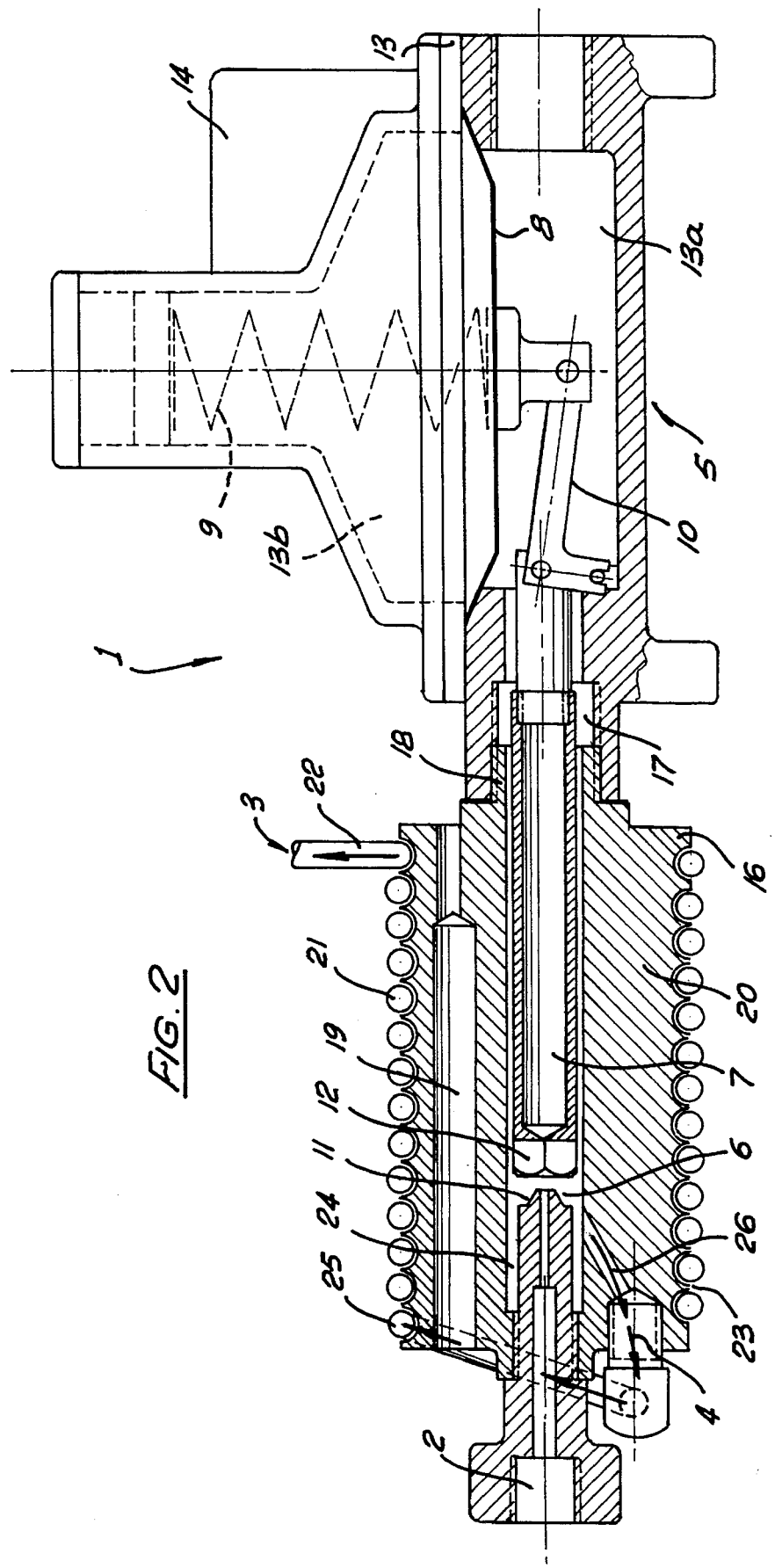
FIG. 2 is an enlarged sectional view of the pressure regulator shown in FIG. 1.

Referring first to FIGS. 1 and 2 of the drawings, the pressure regulator 1 includes a gas inlet 2 and a gas outlet 3, defining therebetween a gas path illustrated by arrows 4.

A regulating element shown generally by numeral 5 is provided at a position remote and downstream from the gas inlet 2 so as to effectively be off-line from the gas path 4. The regulating element 5 is shown mechanically connected to and thereby operates an inlet valve 6 at the inlet 2 by means of an extended actuating arm 7.

The regulating element 5 includes a body 13 separated by a diaphragm 8 to define an active chamber portion 13a and an inactive chamber portion 13b. The diaphragm 8 is displaceable by the pressure of the gas exerted against a spring 9 of predetermined tension located in the inactive chamber portion 13b. The spring tension can be varied to adjust the pressure regulator setting and thus the amount of reduction in pressure.

The diaphragm 8 is connected to the inlet valve 6 by the actuating arm 7 which extends from a linkage mechanism shown generally at 10 that serves to increase the mechanical advantage between the diaphragm 8 and the inlet valve 6. In this preferred embodiment, the inlet valve 6 includes an inlet nozzle 11, the outlet to which is opened and closed by means of a stem tip 12 attached to the distal end of the actuating arm 7.

In the embodiment described, the regulating element is preferably a modified regulator of the kind manufactured by the company REGO and identified as the LV4403SR and TR series.

The selected REGO regulator has a 5–35 kPa or 35–70 kPa rating. The diaphragm 8 is approximately 100 mm in diameter and the mechanism 10 is a pivoted linkage that provides a reduction ratio of approximately 5:1. This serves to convert a coarse deflection of the diaphragm in the illustrated vertical direction, to a fine axial movement of the actuating arm 7 and stem tip 12 toward and away from the inlet nozzle 11, with a corresponding increase in the force applied thereto. For the application illustrated a nozzle having an outlet diameter of approximately 1 mm is preferred. The regulating element also includes a pressure relief valve 14.

Disposed around the inlet valve 6 at the gas inlet 2 and extending along the gas path 4 in the direction of the regulating element 5 is a heat exchanger means in the form of a heater unit shown generally at 15. The heater unit 15 includes a generally cylindrical hollow body 16 adapted for connection to an inlet 17 of the regulating element 5 by means of a threaded connection shown at 18. The heater unit 15 also includes at least one, preferably a plurality of circumferentially spaced longitudinally extending heating elements 19, mounted in the wall 20 of the hollow body 16. A gas heating passage shown generally at 21 is provided in the form of a long length of tubing 22 coiled around the periphery 23 of the hollow body 16. In the embodiment described a tubing length of about 2.5 m is preferred.

The heater unit 15 is arranged such that the inlet valve 6 is disposed within a hollow portion 24 of the heater unit 15 at an end 25 remote from the regulating element 5. The outlet of the valve 6 is placed in fluid flow communication with the tubing 22 by means of an interconnecting passage 26.

When used in a gaseous fumigant distribution system of the type shown in FIG. 1, the gas inlet 2 of the pressure regulator 1 is connected via a conduit 30 to a high pressure source of pesticide in a liquified $CO_2$ base stored in a cylinder 31. The conduit 30 preferably includes a check valve 32 at one end thereof adapted for connection to the cylinder 31. The check valve may comprise a Shrader® type valve. This valve is used primarily to prevent air and moisture from entering the line after disconnection of the conduit 30 from the cylinder 31. The conduit 30 may also include an in-line filter 33 and a pressure indicator 34 as illustrated. A solenoid valve 35 and flow indicating system 36 are also provided in the line 37 to the storage area of a silo or other location to which the fumigant is to be delivered.

At least one pressure sensor 44 for detecting the pressure inside the pressure regulator 5 is preferably located within the pressure regulator 5 and outside of the tubing 22, most preferably within the active chamber portion 13a. The sensors 44 are connected to a pressure differential switch 45. The pressure differential switch 45 and electrical connections to the heating elements 19 are all connected to a central control panel 50.

In use, a gas mixture in cylinder 31, which is stored at a pressure of the order of about 5 MPa, is delivered to the inlet valve 6. Gas admitted through the inlet valve 6 is passed around the actuating arm 7 and linkage mechanism 10 into the active chamber portion 13a of the regulating element 5.

The spring 9 of the regulating element 5 acts on the diaphragm 8 to force the diaphragm downward such that the inlet valve 6 is biased in an inoperative condition into the open position. As the gas is admitted to active chamber portion 13a, pressure is exerted on the underside of the diaphragm 8 against the action of the spring 9. The stem tip 12 is forcibly driven against the inlet nozzle 11 to thereby control the pressure of the gas delivered to the gas outlet 3.

The pressure differential switch 45 monitors the pressure difference across the pressure regulator 5 between the gas inlet 2, which is the same as the active chamber portion 13a of the regulating element 5, and the gas outlet 3. This is equivalent to the pressure difference across the respective ends of the tubing 22. Under normal operating conditions when there is gas flow, there should be a small pressure drop of the order of 50 kPa–68 kPa due to pressure losses in the tubing 22 of the heater unit 15. When there is no flow however, the pressure equalizes and the no-flow condition is thereby detected.

The heater unit 15 is adapted to maintain a temperature adjacent the gas inlet 2 of around 25° C. This is sufficient to ensure that dry ice does not form and that the regulating element 5 is not subjected to the potentially damaging effects of low temperature operating conditions. This is particularly important with $CO_2$ as it will naturally cool on release from the cylinder to temperatures as low as –80° C.

Figure 4:
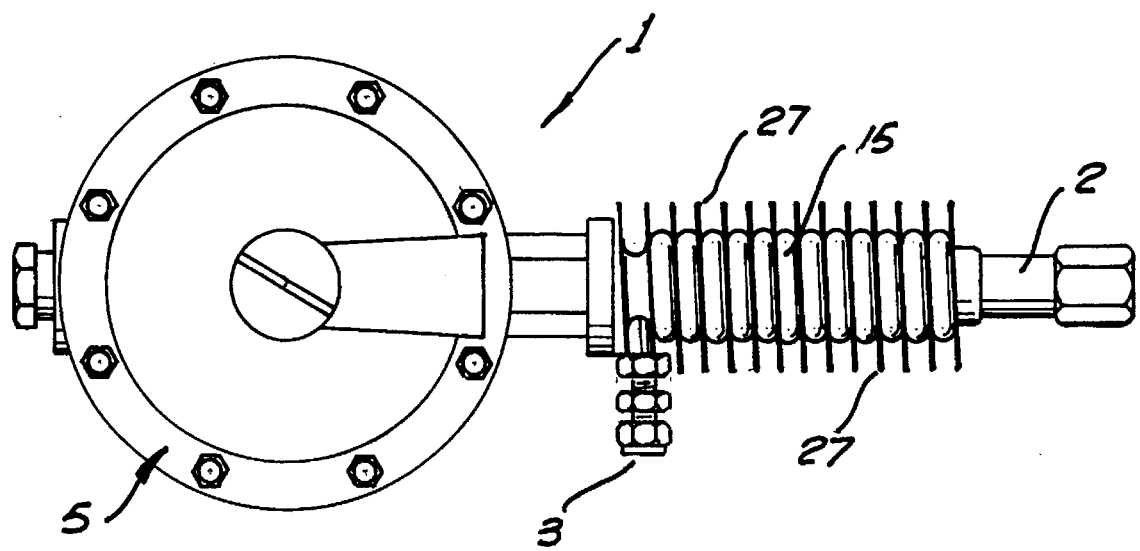
FIG. 4 is a schematic plan view of the pressure regulator shown in FIG. 3.
Figure 3:
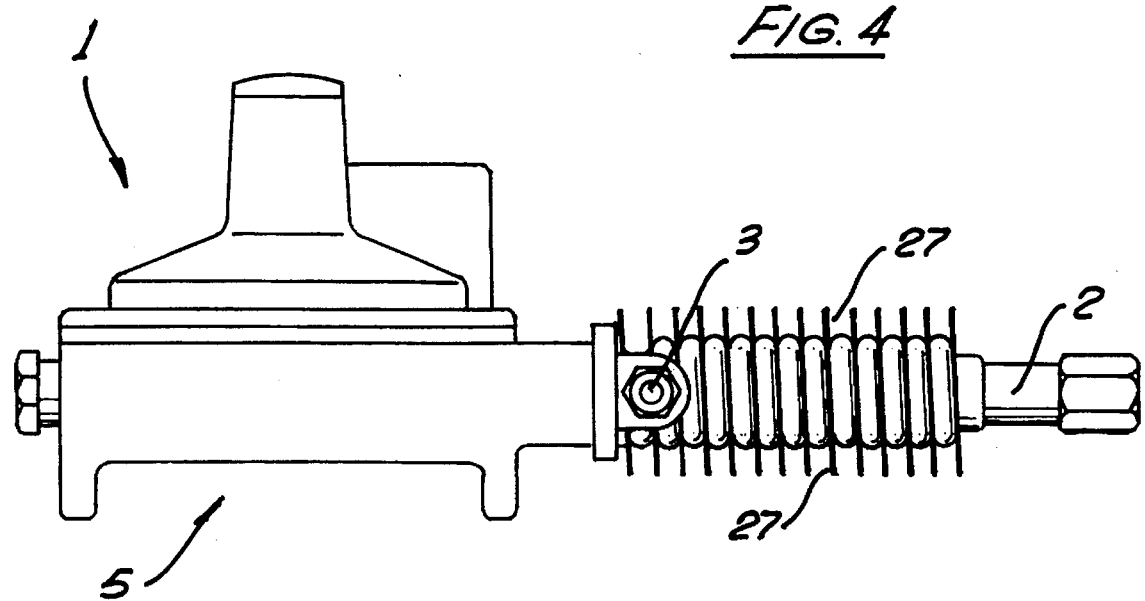
FIG. 3 is a schematic side view of a second embodiment of a pressure regulator according to the invention.

Referring next to FIGS. 3 and 4 there is shown second embodiment of the low flow rate regulator according to the invention.

In this second embodiment, the heater unit 15 does not include heating elements 19 as shown in FIGS. 1 and 2. Instead the heater unit 15 has a plurality of external fins 27 that transfer ambient heat to the sub-ambient gas in the tubing 22. The internal workings of the device are otherwise essentially the same as that described with reference to FIGS. 1 and 2.

It will be appreciated that the pressure regulator of the invention provides sensitive and accurate regulation of pressure, which corresponds to a sensitive and accurate control of gas flow.

Furthermore, the pressure regulator of the invention is capable of pressure reductions of up to approximately 50,000:1 or even approximately 100,000:1 depending on: the size of the regulating element; the mechanical advantage conferred by the linkage mechanism 10; and the size of the inlet nozzle 11.

The pressure regulator according to the invention is also highly resistant to contamination in comparison to prior art flow regulating devices, particularly those using needle valve restrictors or other control valves and the like. In the event of a build-up of contamination with the pressure regulator of the invention, the resulting pressure reduction caused by the blockage serves to open the inlet valve which momentarily admits high pressure gas into the valve thereby automatically cleaning the valve seat. Similar contamination would build up and block needle valve type devices of the prior art.

While a regulating element employing a diaphragm has been illustrated, a piston type regulator or other regulating mechanism could be employed in a similar manner.

Although the invention has been described with reference to specific embodiments, it will be appreciated by those of ordinary skill in the art, that the invention may be embodied in many other forms.

We claim:

1. A pressure regulator for lower pressure delivery of a gas from a higher pressure source, said pressure regulator comprising:

a gas inlet and a gas outlet defining a gas path therebetween;

a regulating element disposed downstream of the gas inlet and remote from the gas path;

valve means provided at the gas inlet; and heat exchanger means extending from said valve means along at least a portion of the gas path;

said regulating element comprising resiliently displaceable means responsive to pressure generated by gas from the gas inlet, and actuating means operatively connected to the valve means at the gas inlet to thereby regulate the pressure of the gas at the gas outlet, said actuating means comprising linkage arm means for increasing the mechanical advantage between the regulating element and the valve means such that a course deflection of the resiliently displaceable means of the regulating element is converted to a fine movement of the valve means with a corresponding increase in the force applied thereto.

2. The pressure regulator of claim 1 wherein the heat exchanger means extends from at least the gas inlet to the regulating element.

3. The pressure regulator of claim 1 wherein the valve means is disposed within the heat exchanger means.

4. The pressure regulator of claim 1 wherein the heat exchanger means comprises a heater having a hollow body operatively connected to the regulating element and adapted to receive the actuating means and valve means, at least one externally powered heater element mounted in a wall of the hollow body, and a gas heating passage coiled around the hollow body and in fluid flow communication with the valve means.

5. The pressure regulator of claim 1 wherein the heat exchanger means comprises a non-powered ambient temperature heater having a hollow body operatively connected to the regulating element and adapted to receive the actuating means and valve means, and an ambient temperature gas heating passage coiled around the hollow body and in fluid flow communication with the valve means.

6. The pressure regulator of claim 5 wherein the heat exchanger means further comprises external fins adapted to exchange heat with the ambient air.

7. The pressure regulator of claim 1 wherein the actuating means comprises an actuating arm movable into and out of engagement with the valve means, a linkage mechanism operatively connected at one end to the actuating arm and at an opposed end to the resiliently displaceable means, wherein movement of the resiliently displaceable means in response to pressure generated by the gas from the gas inlet causes the actuating arm to move into engagement with the valve means.

8. The pressure regulator of claim 7 wherein the resiliently displaceable means is a diaphragm.

9. The pressure regulator of claim 7 wherein the valve means comprises an inlet nozzle disposed within the hollow portion of the heater and operatively associated with the actuating arm, said inlet nozzle having an outlet in fluid flow communication with the gas heating passage.

10. The pressure regulator of claim 8 wherein the regulating element comprises a chamber separated by the diaphragm into an active pressurizable chamber portion and an inactive chamber portion, the diaphragm being displaceable by gas pressure against a spring of predetermined tension.

11. A gas distribution system for delivering a gaseous fumigant from a higher pressure source to a storage area at a lower pressure, said gas distribution system comprising:

a pressure regulator comprising;

a gag inlet and a gas outlet defining a gas path therebetween, a regulating element disposed downstream of the gas inlet and remote from the gas path, valve means provided at the gas inlet, and heat exchanger means extending from said valve means along at least a portion of the gas path, said regulating element comprising resiliently displaceable means responsive to pressure generated by gas from the gas inlet and actuating means operatively connected to the valve means at the gas inlet to thereby regulate the pressure of the gas at the gas outlet, said actuating means comprising linkage arm means for increasing the mechanical advantage between the regulating element and the valve means such that a course deflection of the resiliently displaceable means of the regulating element is converted to a fine movement of the valve means with a corresponding increase in the force applied thereto; and flow monitoring means operatively connected to the gas outlet for monitoring the flow rate of the gas at said lower pressure from the gas outlet to a storage area.

12. The gas distribution system of claim 11 wherein the higher pressure source of gas comprises a pressurized storage cylinder containing a fumigant in a liquifiable gas base.

13. The gas distribution system of claim 11 further comprising means for preventing air and moisture from entering the system.

14. The gas distribution system of claim 13 wherein the means for preventing air and moisture from entering the system comprises a check valve operatively connected to a conduit for the passage of the gas from the higher pressure source to the valve means.

15. The gas distribution system of claim 11 further comprising a central control means adapted to be programmed to operate the system automatically.

16. The gas distribution system of claim 11 further comprising a pressure differential switch for measuring the pressure difference between the gas inlet and the gas outlet of the pressure regulator to thereby detect the presence or absence of the flow of gas.

* * * * *